United States Patent
McArdle et al.

(10) Patent No.: US 9,070,219 B2
(45) Date of Patent: Jun. 30, 2015

(54) SYSTEM AND METHOD FOR PRESENTING VIRTUAL AND AUGMENTED REALITY SCENES TO A USER

(75) Inventors: Terrence Edward McArdle, San Francisco, CA (US); Benjamin Zeis Newhouse, San Francisco, CA (US)

(73) Assignee: Aria Glassworks, Inc., San Francisco, CA (US)

( * ) Notice: Subject to any disclaimer, the term of this patent is extended or adjusted under 35 U.S.C. 154(b) by 0 days.

(21) Appl. No.: 13/302,964

(22) Filed: Nov. 22, 2011

(65) Prior Publication Data

US 2012/0218306 A1    Aug. 30, 2012

Related U.S. Application Data

(60) Provisional application No. 61/417,198, filed on Nov. 24, 2010, provisional application No. 61/448,130, filed on Mar. 1, 2011.

(51) Int. Cl.
*G06T 15/20* (2011.01)
*G06T 19/00* (2011.01)

(52) U.S. Cl.
CPC .............. *G06T 15/20* (2013.01); *G06T 19/003* (2013.01); *G06F 2200/1637* (2013.01); *G06T 19/006* (2013.01)

(58) Field of Classification Search
CPC .... G06T 15/20; G06T 2215/16; G06T 19/006
See application file for complete search history.

(56) References Cited

U.S. PATENT DOCUMENTS

| | | | |
|---|---|---|---|
| 5,287,437 A * | 2/1994 | Deering | 345/427 |
| 5,841,439 A * | 11/1998 | Pose et al. | 345/418 |
| 5,990,941 A | 11/1999 | Jackson et al. | |
| 6,226,669 B1 | 5/2001 | Huang et al. | |
| 6,389,179 B1 | 5/2002 | Katayama et al. | |
| 6,760,026 B2 | 7/2004 | Li et al. | |
| 7,133,068 B2 | 11/2006 | Fisher et al. | |
| 7,224,326 B2 * | 5/2007 | Sefton | 345/8 |
| 7,389,591 B2 | 6/2008 | Jaiswal et al. | |

(Continued)

FOREIGN PATENT DOCUMENTS

WO    2008107553 A    9/2008

OTHER PUBLICATIONS

Easypano Holdings Inc, "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.orgverified date of Jul. 11, 2009, pp. 24-74.

(Continued)

*Primary Examiner* — Kee M Tung
*Assistant Examiner* — Ryan M Gray
(74) *Attorney, Agent, or Firm* — Kilpatrick Townsend & Stockton LLP

(57) ABSTRACT

A method of presenting a scene to a user according to a preferred embodiment includes determining a real orientation of a device relative to a projection matrix and determining a user orientation of the device relative to a nodal point. The method of the preferred embodiment can further include orienting a scene displayable on the device to the user in response to the real orientation and the user orientation; and displaying the scene on the device. The method of the preferred embodiment can be performed by an apparatus and/or embodied in computer program product including machine-readable code.

20 Claims, 6 Drawing Sheets

(56) References Cited

U.S. PATENT DOCUMENTS

| | | | |
|---|---|---|---|
| 7,424,218 B2 | 9/2008 | Baudisch et al. | |
| 7,499,586 B2 | 3/2009 | Agarwala et al. | |
| 7,564,469 B2 | 7/2009 | Cohen | |
| 8,041,574 B2 | 10/2011 | Yano | |
| 8,144,232 B2 | 3/2012 | Larson et al. | |
| 8,301,159 B2 | 10/2012 | Hamynen et al. | |
| 8,384,718 B2* | 2/2013 | Dahlke | 345/467 |
| 8,730,156 B2 | 5/2014 | Weising et al. | |
| 2001/0030693 A1 | 10/2001 | Fisher et al. | |
| 2002/0158873 A1 | 10/2002 | Williamson | |
| 2004/0027330 A1 | 2/2004 | Bradski | |
| 2005/0219239 A1 | 10/2005 | Mashitani et al. | |
| 2005/0286125 A1* | 12/2005 | Sundstrom et al. | 359/462 |
| 2006/0050140 A1 | 3/2006 | Shin et al. | |
| 2006/0082692 A1 | 4/2006 | Kamijima et al. | |
| 2007/0025723 A1 | 2/2007 | Baudisch et al. | |
| 2007/0035562 A1 | 2/2007 | Azuma et al. | |
| 2007/0076016 A1 | 4/2007 | Agarwala et al. | |
| 2007/0103543 A1 | 5/2007 | Anderson et al. | |
| 2007/0168418 A1 | 7/2007 | Ratnakar | |
| 2007/0236493 A1 | 10/2007 | Horiuchi et al. | |
| 2008/0042973 A1 | 2/2008 | Zhao et al. | |
| 2008/0071559 A1 | 3/2008 | Arrasvuori | |
| 2008/0082692 A1 | 4/2008 | Yano | |
| 2008/0094417 A1 | 4/2008 | Cohen | |
| 2008/0194323 A1 | 8/2008 | Merkli et al. | |
| 2008/0266326 A1 | 10/2008 | Porwal | |
| 2008/0280676 A1 | 11/2008 | Distanik et al. | |
| 2008/0292131 A1 | 11/2008 | Takemoto et al. | |
| 2008/0309508 A1 | 12/2008 | Harmon | |
| 2009/0140887 A1 | 6/2009 | Breed et al. | |
| 2009/0237564 A1 | 9/2009 | Kikinis et al. | |
| 2009/0240431 A1 | 9/2009 | Chau et al. | |
| 2009/0244097 A1* | 10/2009 | Estevez | 345/633 |
| 2009/0292774 A1 | 11/2009 | Box et al. | |
| 2010/0002122 A1 | 1/2010 | Larson et al. | |
| 2010/0007657 A1 | 1/2010 | Rurin | |
| 2010/0066763 A1* | 3/2010 | Macdougall et al. | 345/656 |
| 2010/0092079 A1 | 4/2010 | Aller | |
| 2010/0125816 A1* | 5/2010 | Bezos | 715/863 |
| 2010/0161658 A1 | 6/2010 | Hamynen et al. | |
| 2010/0169837 A1 | 7/2010 | Hyndman | |
| 2010/0171758 A1 | 7/2010 | Maassel et al. | |
| 2010/0188397 A1* | 7/2010 | Tsai et al. | 345/419 |
| 2010/0214111 A1 | 8/2010 | Schuler et al. | |
| 2010/0228633 A1 | 9/2010 | Guimaraes et al. | |
| 2010/0287485 A1 | 11/2010 | Bertolami et al. | |
| 2011/0041060 A1 | 2/2011 | Chien et al. | |
| 2011/0090252 A1 | 4/2011 | Yoon et al. | |
| 2011/0164116 A1 | 7/2011 | Gay et al. | |
| 2011/0201362 A1 | 8/2011 | Bregman-Amitai et al. | |
| 2011/0213861 A1 | 9/2011 | Fanelli et al. | |
| 2011/0242134 A1* | 10/2011 | Miller et al. | 345/633 |
| 2011/0248987 A1* | 10/2011 | Mitchell | 345/419 |
| 2011/0273451 A1 | 11/2011 | Salemann | |
| 2012/0086728 A1 | 4/2012 | Mcardle et al. | |
| 2012/0105440 A1 | 5/2012 | Lieberman et al. | |
| 2012/0113264 A1 | 5/2012 | Moshrefi et al. | |
| 2012/0212405 A1 | 8/2012 | Newhouse et al. | |
| 2012/0214590 A1 | 8/2012 | Newhouse et al. | |
| 2012/0236029 A1 | 9/2012 | Newhouse et al. | |
| 2012/0242656 A1 | 9/2012 | McArdle et al. | |
| 2012/0242798 A1 | 9/2012 | McArdle et al. | |
| 2012/0246223 A1 | 9/2012 | Newhouse et al. | |
| 2014/0092135 A1 | 4/2014 | McArdle et al. | |

OTHER PUBLICATIONS

Hewlett Packard, "HP Photosmart R717 Digital Camera with HP Instant Share User's Manual", Copyright 2005 Hewlett-Packard Development Company, L.P., downloaded from http://h1 0032.www1.hp.com/ctg/Manual/c00298985.pdf on May 3, 2013, pp. 50-54.

Ducket, Jon, "Beginning HTML, XHTML, CSS, and JavaScript (R)," Dec. 30, 2009, Wrox, p. 234.

"Motion Control Simulation Applet" http://ir.exp.sis.pitt.edu/res2/data/is/group5/. Archived on Sep. 1, 2006. Retrieved onNov. 5, 2013 from <https://web.archive.org/web/20060901110520/http://ir.exp.sis.pitt.edu/res2/data/is/group5/>.

"Rotations and Euler angles." http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.

Hwang et al. "Hand-held virtual reality: a feasibility study." Proceedings of the ACM symposium on Virtual reality software and technology. ACM, 2006.

Fauster, Loris, and T. U. Wien. "Stereoscopic techniques in computer graphics." TU Wien (2007), 10 pages.

Kanbara, Masayuki, et al. "A stereoscopic video see-through augmented reality system based on real-time vision-based registration." Virtual Reality, 2000. Proceedings. IEEE. IEEE, 2000, 8 pages.

Parr62, Ben; "Easter Egg: Yelp Is the iPhone's First Augmented Reality App,"; located at https://web.archive.org/web/20090829094113/http://mashable.com/2009/08/2007/yelp-aug . . .; Aug. 27, 2009; 10 pages.

Hildenbrand, Jerry; "Yelp 2.0 brings monocle and checkins to its Android Client,"; located at http://www.androidcentral.com/yelp-20-brings-monocle-andcheckins-its-android-client; Jul. 5, 2010; 10 pages.

* cited by examiner

SYSTEM AND METHOD FOR PRESENTING VIRTUAL AND AUGMENTED REALITY SCENES TO A USER

CLAIM OF PRIORITY

The present application claims priority to: U.S. Provisional Patent Application Ser. No. 61/417,198 filed on 24 Nov. 2010, entitled "Method for Mapping Virtual and Augmented Reality Scenes to a Display," and U.S. Provisional Patent Application Ser. No. 61/448,130 filed on 1 Mar. 2011, entitled "For Mapping Virtual and Augmented Reality Scenes to a Display," both of which are incorporated herein in their entirety by this reference.

TECHNICAL FIELD

This invention relates generally to the virtual and augmented reality field, and more specifically to a new and useful system and method for presenting virtual and augmented reality scenes to a user.

BACKGROUND AND SUMMARY

There has been a rise in the availability of mobile computing devices in recent years. These devices typically include inertial measurement units, compasses, GPS transceivers, and a screen. Such capabilities have led to the development and use of augmented reality applications. However, the handheld computing device by its nature has no sensing coupled to the human viewer and thus truly immersive experiences are lost through this technical disconnect. When viewing augmented reality the perspective is relative to the mobile device and not the user. Thus, there is a need in the virtual and augmented reality field to create a new and useful system and/or method for presenting virtual and augmented reality scenes to a user.

Accordingly, a method of presenting a scene to a user according to a preferred embodiment includes determining a real orientation of a device relative to a projection matrix and determining a user orientation of the device relative to a nodal point. The method of the preferred embodiment can further include orienting a scene displayable on the device to the user in response to the real orientation and the user orientation; and displaying the scene on the device.

An apparatus for presenting a scene to a user according to a preferred embodiment includes a user interface including a display and a camera substantially oriented in a first direction. The apparatus of the preferred embodiment can also include a real orientation module configured to determine a three-dimensional spatial real orientation of the user interface relative to a projection matrix and a user orientation module configured to determine a user orientation of the user interface relative to a nodal point. The apparatus of the preferred embodiment can further include a processor connected to the user interface, the real orientation module, and the user orientation module. The processor of the apparatus of the preferred embodiment can be configured to display a scene to the user on the display in response to the real orientation and the user orientation. Additional features and advantages of the preferred embodiments and variations thereof are described in greater detail below with reference to the following drawings.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method of the Preferred Embodiment

Figure 1:
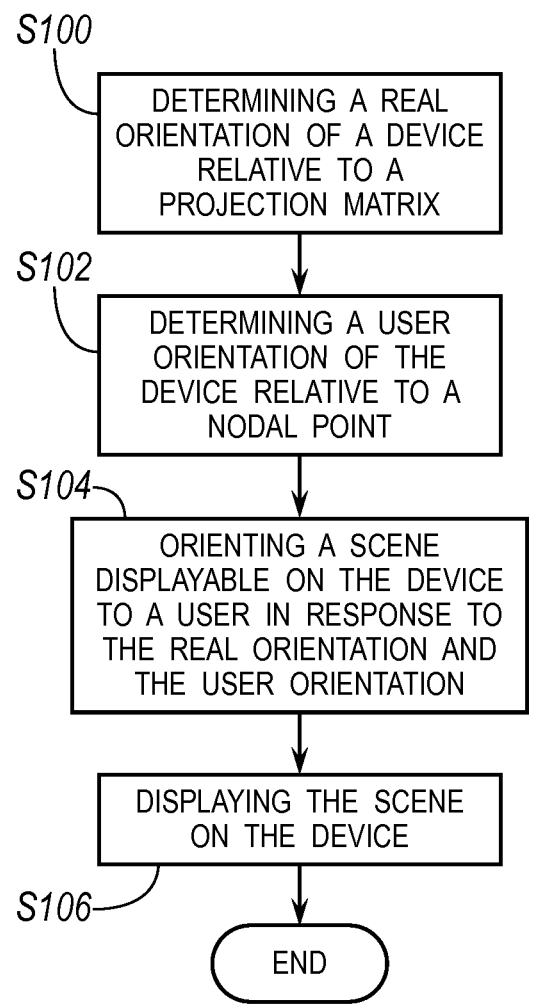
FIG. 1 is a flowchart depicting a method for presenting a virtual or augmented reality scene to a user in accordance with a preferred embodiment of the present invention.

As shown in FIG. 1, a method of a preferred embodiment can include determining a real orientation of a device relative to a projection matrix in block S100 and determining a user orientation of the device relative to a nodal point in block S102. The method of the preferred embodiment can further include orienting a scene displayable on the device to the user in response to the real orientation and the user orientation in block S104 and displaying the scene on the device in block S106. The method of the preferred embodiment functions to present a virtual and/or augmented reality (VAR) scene to a user from the point of view of a nodal point or center thereof, such that it appears to the user that he or she is viewing the world (represented by the VAR scene) through a frame of a window. The method of the preferred embodiment can be performed at least in part by any number of selected devices, including any mobile computing devices such as smart phones, personal computers, laptop computers, tablet computers, or any other device of the type described below.

As shown in FIG. 1, the method of the preferred embodiment can include block S100, which recites determining a real orientation of a device relative to a projection matrix. Block S100 functions to provide a frame of reference for the device as it relates to a world around it, wherein the world around can include real three dimensional space, a virtual reality space, an augmented reality space, or any suitable combination thereof. Preferably, the projection matrix can include a mathematical representation of an arbitrary orientation of a three-dimensional object having three degrees of freedom relative to a second frame of reference. As an example, the projection matrix can include a mathematical representation of a device's orientation in terms of its Euler angles (pitch, roll, yaw) in any suitable coordinate system. In one variation of the method of the preferred embodiment, the second frame of reference can include a three-dimensional external frame of reference (i.e., real space) in which the gravitational force defines baseline directionality for the relevant coordinate system against which the absolute orientation of the device can be measured. Preferably, the real orientation of the device can include an orientation of the device relative to the second frame of reference, which as noted above can include a real three-dimensional frame of reference. In such an example implementation, the device will have certain orientations corresponding to real world orientations, such as up and down, and further such that the device can be rolled, pitched, and/or yawed within the external frame of reference.

As shown in FIG. 1, the method of the preferred embodiment can also include block S102, which recites determining a user orientation of the device relative to a nodal point. Block S102 preferably functions to provide a frame of reference for the device relative to a point or object in space, including a point or object in real space. Preferably, the user orientation can include a measurement of a distance and/or rotational value/s of the device relative to the nodal point. In another variation of the method of the preferred embodiment, the nodal point can include a user's head such that the user orientation includes a measurement of the relative distance and/or rotational value/s of the device relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. Preferably, the user orientation functions to create a viewing relationship between a user (optionally located at the nodal point) and the device, such that a change in user orientation can cause a consummate change in viewable content consistent with the user's VAR interaction, i.e., such that the user's view through the frame will be adjusted consistent with the user's orientation relative to the frame.

As shown in FIG. 1, the method of the preferred embodiment can also include block S104, which recites orienting a scene displayable on the device to a user in response to the real orientation and the user orientation. Block S104 preferably functions to process, compute, calculate, determine, and/or create a VAR scene that can be displayed on the device to a user, wherein the VAR scene is oriented to mimic the effect of the user viewing the VAR scene as if through the frame of the device. Preferably, orienting the scene can include preparing a VAR scene for display such that the viewable scene matches what the user would view in a real three-dimensional view, that is, such that the displayable scene provides a simulation of real viewable space to the user as if the device were a transparent frame. As noted above, the scene is preferably a VAR scene, therefore it can include one or more virtual and/or augmented reality elements composing, in addition to, and/or in lieu of one or more real elements (buildings, roads, landmarks, and the like, either real or fictitious). Alternatively, the scene can include processed or unprocessed images/videos/multimedia files of a multitude of scene aspects, including both actual and fictitious elements as noted above.

As shown in FIG. 1, the method of the preferred embodiment can further include block S106, which recites displaying the scene on the device. Block S106 preferably functions to render, present, project, image, and/or display viewable content on, in, or by a device of the type described below. Preferably, the displayable scene can include a spherical image of a space having virtual and/or augmented reality components. In one variation of the method of the preferred embodiment, the spherical image displayable on the device can be substantially symmetrically disposed about the nodal point, i.e. the nodal point is substantially coincident with and/or functions as an origin of a spheroid upon which the image is rendered.

In another variation of the method of the preferred embodiment, the method can include displaying portion of the spherical image in response to the real orientation of the device. Preferably, the portion of the spherical image that is displayed corresponds to an overlap between a viewing frustum of the device (i.e., a viewing cone projected from the device) and the imaginary sphere that includes the spherical image. The resulting displayed portion of the spherical image is preferably a portion of the spherical image, which can include a substantially rectangular display of a concave, convex, or hyperbolic rectangular portion of the sphere of the spherical image. Preferably, the nodal point is disposed at approximately the origin of the spherical image, such that a user has the illusion of being located at the center of a larger sphere or bubble having the VAR scene displayed on its interior. Alternatively, the nodal point can be disposed at any other suitable vantage point within the spherical image displayable by the device. In another alternative, the displayable scene can include a substantially planar and/or ribbon-like geometry from which the nodal point is distanced in a constant or variable fashion. Preferably, the display of the scene can be performed within a 3D or 2D graphics platform such as OpenGL, WebGL, or Direct 3D. Alternatively, the display of the scene can be performed within a browser environment using one or more of HTML5, CSS3, or any other suitable markup language. In another variation of the method of the preferred embodiment, the geometry of the displayable scene can be altered and/or varied in response to an automated input and/or in response to a user input.

Figure 2:
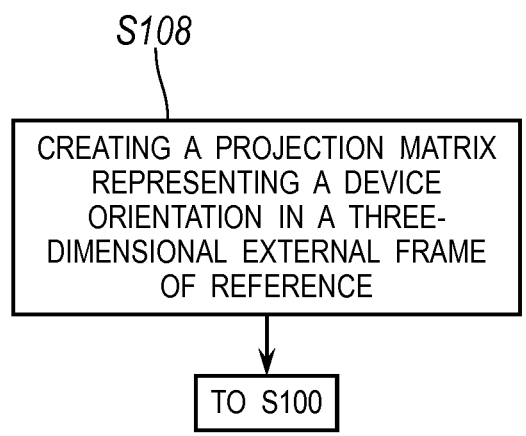
FIG. 2 is a flowchart depicting a method for presenting a virtual or augmented reality scene to a user in accordance with a variation of the preferred embodiment of the present invention.

As shown in FIG. 2, another variation of the method of the preferred embodiment can include block S108, which recites creating a projection matrix representative of a device orientation in a three-dimensional external frame of reference. Block S108 preferably functions to coordinate the displayable scene with a physical orientation of the device as established by and/or relative to a user. As noted above, the projection matrix preferably includes a mathematical representation of an arbitrary orientation of a three-dimensional object having three degrees of freedom relative to the external frame of reference. In one variation of the method of the preferred embodiment, the external frame of reference can include a three-dimensional external frame of reference (i.e., real space) in which the gravitational force defines baseline directionality for the relevant coordinate system against which the absolute orientation of the device can be measured. Alternatively, the external frame of reference can include a fictitious external frame of reference, i.e., such as that encountered in a film or novel, whereby any suitable metrics and/or geometries can apply for navigating the device through the pertinent orientations. One example of a fictitious external frame of reference can include a fictitious space station frame of reference, wherein there is little to no gravitational force to provide the baseline directionality noted above. In such an example implementation, the external frame of reference can be fitted or configured consistently with the other features of the VAR scene.

Figure 3:
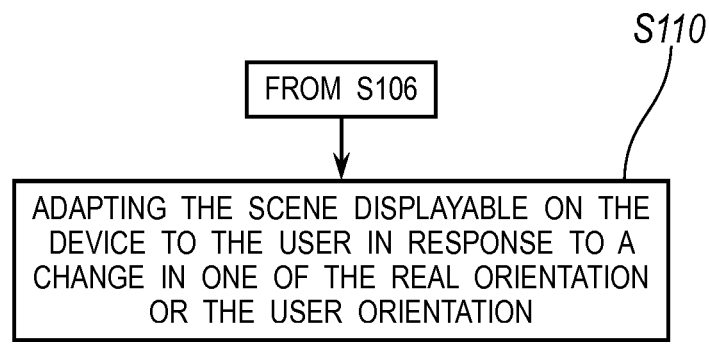
FIG. 3 is a flowchart depicting a method for presenting a virtual or augmented reality scene to a user in accordance with another variation of the preferred embodiment of the present invention.

As shown in FIG. 3, another variation of the method of the preferred embodiment can include block S110, which recites adapting the scene displayable on the device to the user in response to a change in one of the real orientation or the user orientation. Block S110 preferably functions to alter, change, reconfigure, recompute, regenerate, and/or adapt the displayable scene in response to a change in the real orientation or the user orientation. Additionally, block S110 preferably functions to create a uniform and immersive user experience by adapting the displayable scene consistent with movement of the device relative to the projection matrix and/or relative to the nodal point. Preferably, adapting the displayable scene can include at least one of adjusting a virtual zoom of the scene, adjusting a virtual parallax of the scene, adjusting a virtual perspective of the scene, and/or adjusting a virtual origin of the scene. Alternatively, adapting the displayable scene can include any suitable combination of the foregoing, performed substantially serially or substantially simultaneously, in response to a timing of any determined changes in one or both of the real orientation or the user orientation.

Figure 4:
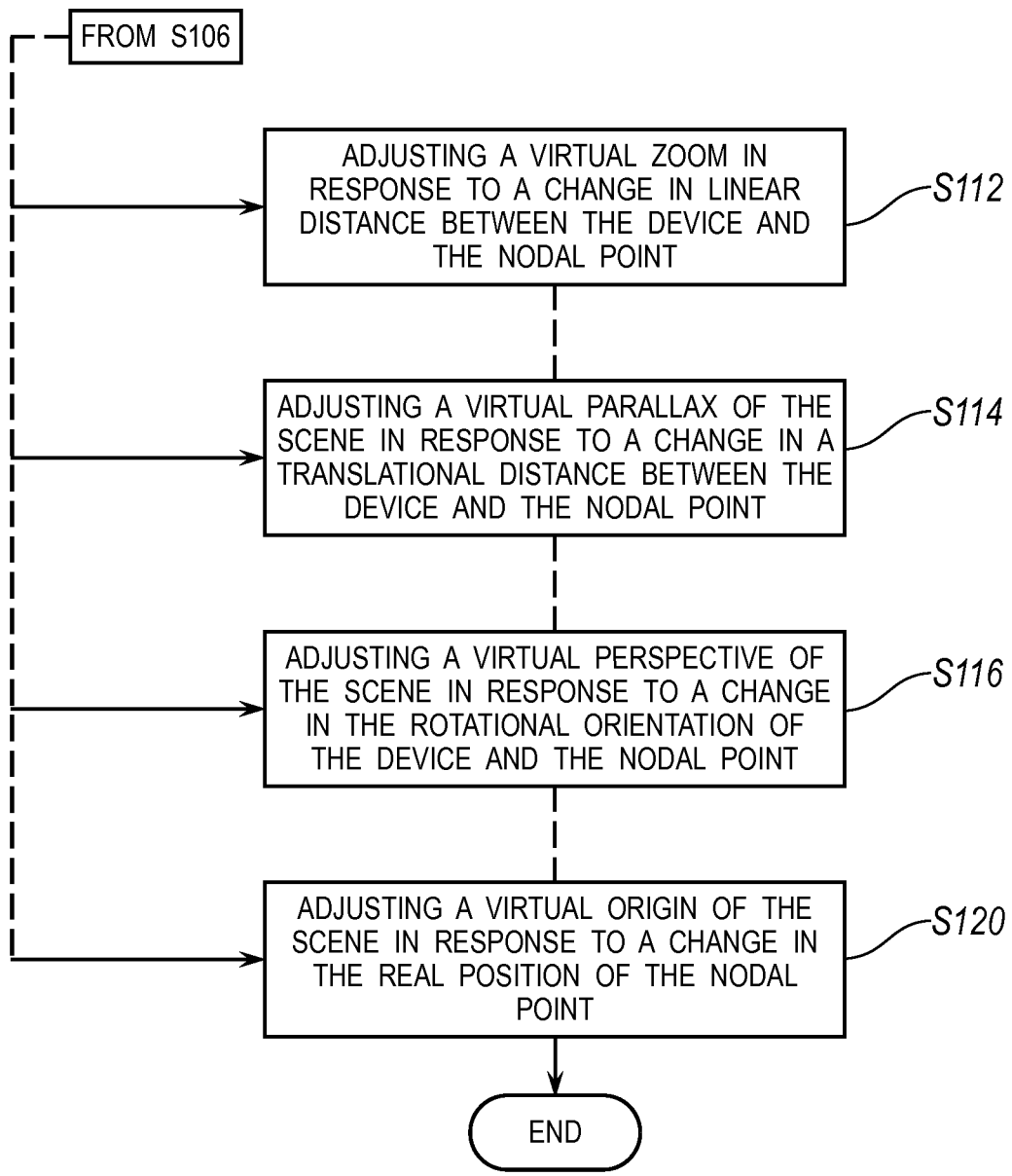
FIG. 4 is a flowchart depicting a method for presenting a virtual or augmented reality scene to a user in accordance with another variation of the preferred embodiment of the present invention.

As shown in FIG. 4, another variation of the method of the preferred embodiment can include block S112, which recites adjusting a virtual zoom of the scene in response to a change in a linear distance between the device and the nodal point. Block S112 preferably functions to resize one or more displayable aspects of the scene in response to a distance between the device and the nodal point to mimic a change in the viewing distance of the one or more aspects of the scene. As noted above, the nodal point can preferably be coincident with a user's head, such that a distance between the device and the nodal point correlates substantially directly with a distance between a user's eyes and the device. Accordingly, adjusting a virtual zoom can function in part to make displayable aspects of the scene relatively larger in response to a decrease in distance between the device and the nodal point; and to make displayable aspects of the scene relatively smaller in response to an increase in distance between the device and the nodal point. Another variation of the method of the preferred embodiment can include measuring a distance between the device and the nodal point, which can include for example using a front facing camera to measure the relative size of the nodal point (i.e., the user's head) in order to calculate the distance. Alternatively, the adjustment of the virtual zoom can be proportional to a real zoom (i.e., a real relative sizing) of the nodal point (i.e., the user's head) as captured by the device camera. Accordingly, as the distance decreases/increases, the size of the user's head will appear to increase/decrease, and the adjustment in the zoom can be linearly and/or non-linearly proportional to the resultant increase/decrease imaged by the camera. Alternatively, the distance between the nodal point and the device can be measured and/or inferred from any other suitable sensor and/or metric, including at least those usable by the device in determining the projection matrix as described below, including for example one or more cameras (front/rear), an accelerometer, a gyroscope, a MEMS gyroscope, a magnetometer, a pedometer, a proximity sensor, an infrared sensor, an ultrasound sensor, and/or any suitable combination thereof.

As shown in FIG. 4, another variation of the method of the preferred embodiment can include block S114, which recites adjusting a virtual parallax of the scene in response to a change in a translational distance between the device and the nodal point. Block S114 preferably functions to reorient the relative size and/or placement of one or more aspects of the displayable scene in response to a translational movement between the device and the nodal point. A translational movement can include for example a relative movement between the nodal point and the device in or along a direction substantially perpendicular to a line of sight from the nodal point, i.e., substantially tangential to an imaginary circle having the nodal point as its origin. As noted above, the nodal point can preferably be coincident with a user's head, such that the translational distance between the device and the nodal point correlates substantially directly with a distance between a user's eyes and the device. Accordingly, adjusting a virtual parallax can function in part to adjust a positioning of certain displayable aspects of the scene relative to other displayable aspects of the scene. In particular, adjusting a virtual parallax preferably causes one or more foreground aspects of the displayable scene to move relative to one or more background aspects of the displayable scene. Another variation of the method of the preferred embodiment can include identifying one or more foreground aspects of the displayable scene and/or identifying one or more background aspects of the displayable scene. Preferably, the one or more foreground aspects of the displayable scene are movable with respect to the one or more background aspects of the displayable scene such that, in block S114, the method of the preferred embodiment can create and/or adjust a virtual parallax viewing experience for a user in response to a change in the translational distance between the device and the nodal point.

Another variation of the method of the preferred embodiment can include measuring a translational distance between the device and the nodal point, which can include for example using a front facing camera to measure the relative size and/or location of the nodal point (i.e., the user's head) in order to calculate the translational distance. Alternatively, the translational distance between the nodal point and the device can be measured and/or inferred from any other suitable sensor and/or metric, including at least those usable by the device in determining the projection matrix as described below, including for example one or more cameras (front/rear), an accelerometer, a gyroscope, a MEMS gyroscope, a magnetometer, a pedometer, a proximity sensor, an infrared sensor, an ultrasound sensor, and/or any suitable combination thereof. Preferably, the translational distance can be measured by a combination of the size of the nodal point (from the front facing camera) and a detection of a planar translation of the device in a direction substantially orthogonal to the direction of the camera, thus indicating a translational movement without any corrective rotation. For example, one or more of the foregoing sensors can determine that the device is moved in a direction substantially orthogonal to the camera direction (tangential to the imaginary sphere surrounding the nodal point), while also determining that there is no rotation of the device (such that the camera is directed radially inwards towards the nodal point). Preferably, the method of the preferred embodiment can treat such a movement as translational in nature and adapt a virtual parallax of the viewable scene accordingly.

As shown in FIG. 4, another variation of the method of the preferred embodiment can include block S116, which recites adjusting a virtual perspective of the scene in response to a change in a rotational orientation of the device and the nodal point. Block S116 preferably functions to reorient, reshape, resize, and/or skew one or more aspects of the displayable scene to convey a sense of perspective and/or a non-plan viewing angle of the scene in response to a rotational movement of the device relative to the nodal point. Preferably, adjustment of the virtual perspective of the scene is related in part to a distance between one end of the device and the nodal point and a distance between the other end of the device and the nodal point. As an example, if a left/top side of the device is closer to the nodal point then the right/bottom side of the device, then aspects of the left/top portion of the scene should be adapted to appear relatively closer (i.e., displayable larger) than aspects of the right/bottom portion of the scene. Preferably, adjustment of the aspects of the scene to create the virtual perspective will apply both to foreground aspects and background aspects, such that the method of the preferred embodiment adjusts the virtual perspective of each aspect of the scene in response to at least its position in the scene, the degree of rotation of the device relative to the nodal point, the relative depth (foreground/background) of the aspect, and/or any other suitable metric or visual cue. As an example, lines that are parallel in the scene when the device is directed at the nodal point (all edges equidistant from the nodal point) will converge in some other direction in the display (i.e., to the left, right, top, bottom, diagonal, etc.) as the device is rotated. Preferably, if the device is rotated such that the left edge is closer to the nodal point than the right edge, then formerly parallel lines can be adjusted to converge towards infinity past the right edge of the device, thus conveying a sense of perspective to the user.

Another variation of the method of the preferred embodiment can include measuring a rotational orientation between the device and the nodal point, which can include for example using a front facing camera to measure the relative position of the nodal point (i.e., the user's head) in order to calculate the rotational orientation. Alternatively, the rotational orientation of the nodal point and the device can be measured and/or inferred from any other suitable sensor and/or metric, including at least those usable by the device in determining the projection matrix as described below, including for example one or more cameras (front/rear), an accelerometer, a gyroscope, a MEMS gyroscope, a magnetometer, a pedometer, a proximity sensor, an infrared sensor, an ultrasound sensor, and/or any suitable combination thereof. Preferably, the rotational orientation can be measured by a combination of the position of the nodal point (as detected by the front facing camera) and a detection of a rotation of the device that shifts the direction of the camera relative to the nodal point. As an example, a front facing camera can be used to determine a rotation of the device by detecting a movement of the nodal point within the field of view of the camera (indicating that the device/camera is being rotated in an opposite direction). Accordingly, if the nodal point moves to the bottom/right of the camera field of view, then the method of the preferred embodiment can determine that the device is being rotated in a direction towards the top/left of the camera field of view. In response to such a rotational orientation, the method of the preferred embodiment preferably mirrors, adjusts, rotates, and/or skews the viewable scene to match the displaced perspective that the device itself views through the front facing camera.

As shown in FIG. 4, another variation of the method of the preferred embodiment can include block S120, which recites adjusting a virtual origin of the scene in response to a change in a real position of the nodal point. Block S120 preferably functions to reorient, reshape, resize, and/or translate one or more aspects of the displayable scene in response to the detection of actual movement of the nodal point. In one variation of the method of the preferred embodiment, the nodal point can include an arbitrary point in real or fictitious space relative to which the scenes described herein are displayable. Accordingly, any movement of the real or fictitious nodal point preferably results in a corresponding adjustment of the displayable scene. In another variation of the method of the preferred embodiment, the nodal point can include a user's head or any suitable portion thereof. In such an implementation, movement of the user in real space can preferably be detected and used for creating the corresponding adjustments in the displayable scene. The real position of the nodal point can preferably be determined using any suitable combination of devices, including for example one or more cameras (front/rear), an accelerometer, a gyroscope, a MEMS gyroscope, a magnetometer, a pedometer, a proximity sensor, an infrared sensor, and/or an ultrasound sensor. As an example, a user can wear a pedometer in communication with the device such that when the user walks through real space, such movement of the user/nodal point is translated into movement in the VAR space, resulting in a corresponding adjustment to the displayable scene. Another variation of the method of the preferred embodiment can include determining a position and/or motion of the device in response to location service signal associated with the device. Example location service signals can include global positioning signals and/or transmission or pilot signals transmittable by the device in attempting to connect to an external network, such as a mobile phone or Wi-Fi type wireless network. Preferably, the real movement of the user/nodal point in space can result in the adjustment of the location of the origin/center/viewing point of the displayable scene.

In another variation of the method of the preferred embodiment, displaying the scene on the device can include displaying a floating-point exposure of the displayable scene in order to minimize lighting irregularities. As noted above, the displayable scene can be any suitable geometry, including for example a spherical image disposed substantially symmetrically about a nodal point. Displaying a floating-point exposure preferably functions to allow the user to view/experience the full dynamic range of the image without having to artificially adjust the dynamic range of the image. Preferably, the method of the preferred embodiment globally adjusts the dynamic range of the image such that a portion of the image in the center of the display is within the dynamic range of the device. By way of comparison, high dynamic range (HDR) images appear unnatural because they attempt to confine a large image range into a smaller display range through tone mapping, which is not how the image is naturally captured by a digital camera. Preferably, the method of the preferred embodiment preserves the natural range of the image by adjusting the range of the image to always fit around (either symmetrically or asymmetrically) the portion of the image viewable in the approximate center of the device's display. As noted above, the displayable scene of the method of the preferred embodiment is adjustable in response to any number of potential inputs relating to the orientation of the device and/or the nodal point. Accordingly, the method of the preferred embodiment can further include adjusting the floating point exposure of the displayable scene in response to any changes in the displayable scene, such as for example adjustments in the virtual zoom, virtual parallax, virtual perspective, and/or virtual origin described in detail above.

In another variation of the method of the preferred embodiment, the device can be a handheld device configured for processing both location-based and orientation-based data such as a smart phone, a tablet computer, or any other suitable device having integrated processing and display capabilities. Preferably, the handheld device can include an inertial measurement unit (IMU), which in turn can include one or more of an accelerometer, a gyroscope, a magnetometer, and/or a MEMS gyroscope. As noted above, the handheld device of the method of the preferred embodiment can also include one or more cameras oriented in one in or more distinct directions, i.e., front-facing and rear-facing, for determining one or more of the real orientation or the user orientation. Additional sensors of the handheld device of the method of the preferred embodiment can include a pedometer, a proximity sensor, an infrared sensor, an ultrasound sensor, and/or a global positioning transceiver. In another variation of the method of the preferred embodiment, the handheld device can be separate from a display, such as a handheld device configured to communicate both real orientation and user orientation to a standalone display such as a computer monitor or television.

1. Apparatus of the Preferred Embodiment

Figure 5:
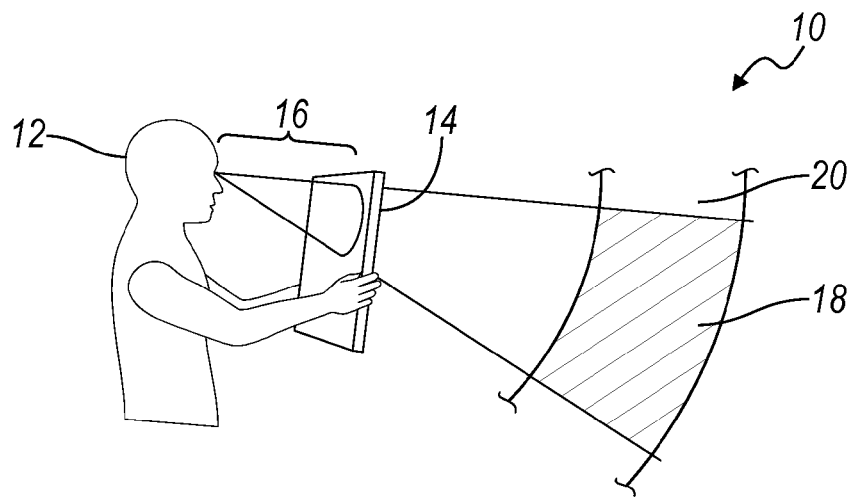
FIG. 5 is a schematic representation of a user interfacing with an apparatus of another preferred embodiment of the present invention.
Figure 6A:
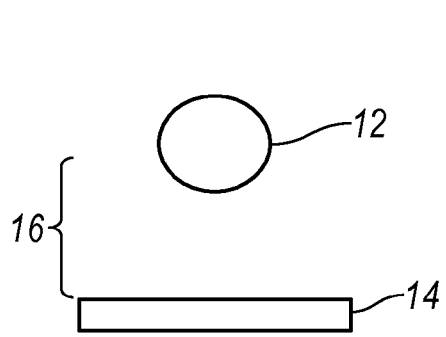
FIGS. 6A, 6B, 6C, and 6D are schematic representations of one or more additional aspects of the apparatus of the preferred embodiment of the present invention.
Figure 6B:
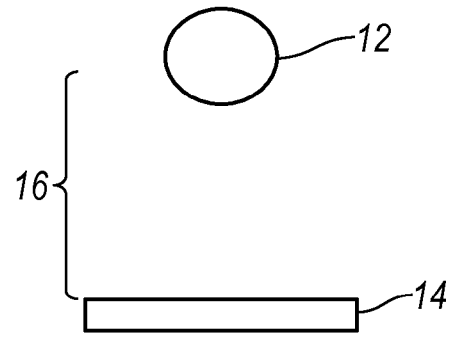
Figure 6C:
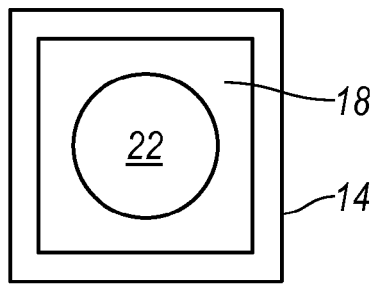
Figure 6D:
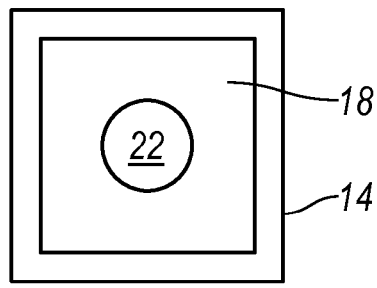
Figure 10:
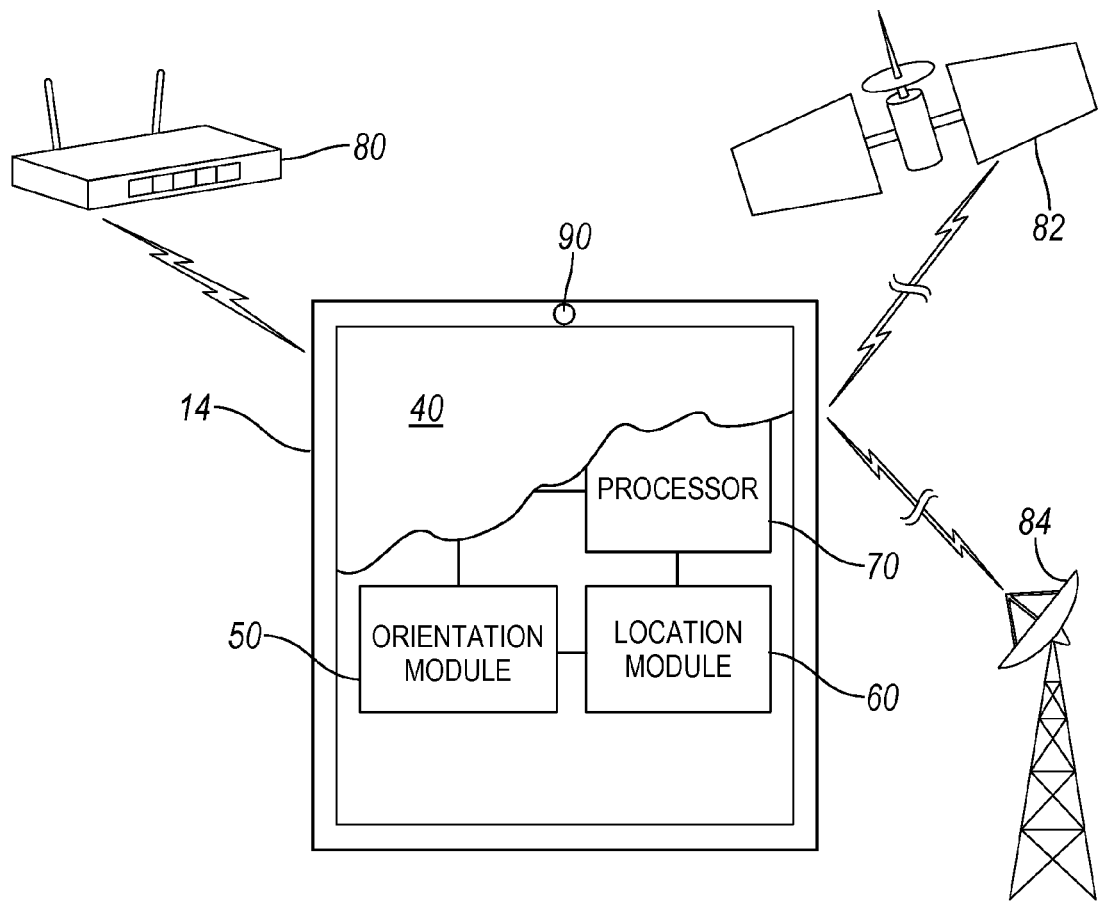
FIG. 10 is a schematic representation of an apparatus of the preferred embodiment of the present invention.

As shown in FIGS. 5 and 10, a device 14 of the preferred embodiment is usable in an operating environment 10 in which a user 12 interfacing with the device 14 at a predetermined distance 16. Preferably, the device 14 can include a user interface having a display 40 and a camera 90 substantially oriented in a first direction towards a user for viewing. The device 14 of the preferred embodiment can also include a real orientation module 50 configured to determine a three-dimensional spatial real orientation of the user interface relative to a projection matrix; and a user orientation module 50 configured to determine a user orientation of the user interface relative to a nodal point. The device 14 of the preferred embodiment can further include a processor 70 connected to the user interface, the real orientation module 50, and the user orientation module 50. Preferably, the processor 70 is configured to display a scene to the user 12 on the display 40 in response to the real orientation and the user orientation pursuant to one or more aspects of the method of the preferred embodiment described above.

As shown in FIG. 10, the device 14 of the preferred embodiment can include a display 40, an orientation module 50 including a real orientation module and a user orientation module, a location module 60, a camera 90 oriented in substantially the same direction as the display 40, and a processor 70 connected to each of the display, orientation module 50, location module 60, and camera 90. The device 14 of the preferred embodiment preferably functions to present a virtual and/or augmented reality (VAR) scene to a user from the point of view of a nodal point or center thereof, such that it appears to the user that he or she is viewing the world (represented by the VAR scene) through a frame of a window. The device 14 of the preferred embodiment can include any suitable type of mobile computing apparatus such as a smart phone, a personal computer, a laptop computer, a tablet computer, a television/monitor paired with a separate handheld orientation/location apparatus, or any suitable combination thereof.

As shown in FIG. 10, the orientation module 50 of the device 14 of the preferred embodiment includes at least a real orientation portion and a user orientation portion. The real orientation portion of the orientation module 50 preferably functions to provide a frame of reference for the device 14 as it relates to a world around it, wherein the world around can include real three dimensional space, a virtual reality space, an augmented reality space, or any suitable combination thereof. As noted above, the projection matrix can preferably include a mathematical representation of an arbitrary orientation of a three-dimensional object (i.e., device 14) having three degrees of freedom relative to a second frame of reference. As noted in the example above, the projection matrix can include a mathematical representation of the device 14 orientation in terms of its Euler angles (pitch, roll, yaw) in any suitable coordinate system.

In one variation of the device 14 of the preferred embodiment, the second frame of reference can include a three-dimensional external frame of reference (i.e., real space) in which the gravitational force defines baseline directionality for the relevant coordinate system against which the absolute orientation of the device 14 can be measured. In such an example implementation, the device 14 will have certain orientations corresponding to real world orientations, such as up and down, and further such that the device 14 can be rolled, pitched, and/or yawed within the external frame of reference. Preferably, the orientation module 50 can include a MEMS gyroscope configured to calculate and/or determine a projection matrix indicative of the orientation of the device 14. In one example configuration, the MEMS gyroscope can be integral with the orientation module 50. Alternatively, the MEMS gyroscope can be integrated into any other suitable portion of the device 14 or maintained as a discrete module of its own.

As shown in FIG. 10, the user orientation portion of the orientation module 50 preferably functions to provide a frame of reference for the device 14 relative to a point or object in space, including a point or object in real space. Preferably, the user orientation can include a measurement of a distance and/or rotational value/s of the device relative to a nodal point. In another variation of the device 14 of the preferred embodiment, the nodal point can include a user's head such that the user orientation includes a measurement of the relative distance and/or rotational value/s of the device 14 relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. Preferably, as shown in FIG. 5, the user orientation portion of the orientation module 50 can function to create a viewing relationship between a user 12 (optionally located at the nodal point) and the device 14, such that a change in user orientation can cause a consummate change in viewable content consistent with the user's VAR interaction, i.e., such that the user's view through the frame will be adjusted consistent with the user's orientation relative to the frame.

As shown in FIG. 10, one variation of the device 14 of the preferred embodiment includes a location module 60 connected to the processor 70 and the orientation module 50. The location module 60 of the preferred embodiment functions to determine a location of the device 14. As noted above, location can refer to a geographic location, which can be indoors, outdoors, above ground, below ground, in the air or on board an aircraft or other vehicle. Preferably, as shown in FIG. 10, the device 14 of the preferred embodiment can be connectable, either through wired or wireless means, to one or more of a satellite positioning system 82, a local area network or wide area network such as a WiFi network 80, and/or a cellular communication network 84. A suitable satellite position system 82 can include for example the Global Positioning System (GPS) constellation of satellites, Galileo, GLONASS, or any other suitable territorial or national satellite positioning system. In one alternative embodiment, the location module 60 of the preferred embodiment can include a GPS transceiver, although any other type of transceiver for satellite-based location services can be employed in lieu of or in addition to a GPS transceiver.

The processor 70 of the device 14 of the preferred embodiment functions to manage the presentation of the VAR scene to the user 12. In particular, the processor 14 preferably functions to display a scene to the user on the display in response to the real orientation and the user orientation. The processor 70 of the preferred embodiment can be configured to process, compute, calculate, determine, and/or create a VAR scene that can be displayed on the device 14 to a user 12, wherein the VAR scene is oriented to mimic the effect of the user 12 viewing the VAR scene as if through the frame of the device 12. Preferably, orienting the scene can include preparing a VAR scene for display such that the viewable scene matches what the user would view in a real three-dimensional view, that is, such that the displayable scene provides a simulation of real viewable space to the user 12 as if the device 14 were a transparent frame. As noted above, the scene is preferably a VAR scene; therefore it can include one or more virtual and/or augmented reality elements composing, in addition to, and/or in lieu of one or more real elements (buildings, roads, landmarks, and the like, either real or fictitious). Alternatively, the scene can include processed or unprocessed images/videos/multimedia files of one or more displayable scene aspects, including both actual and fictitious elements as noted above.

As shown in FIG. 5, in another variation of the device 14 of the preferred embodiment, the scene can include a spherical image 20. Preferably, the portion of the spherical image (i.e., the scene 18) that is displayable by the device 14 corresponds to an overlap between a viewing frustum of the device (i.e., a viewing cone projected from the device) and the imaginary sphere that includes the spherical image 20. The scene 18 is preferably a portion of the spherical image 20, which can include a substantially rectangular display of a concave, convex, or hyperbolic rectangular portion of the sphere of the spherical image 20. Preferably, the nodal point is disposed at approximately the origin of the spherical image 20, such that a user 12 has the illusion of being located at the center of a larger sphere or bubble having the VAR scene displayed on its interior. Alternatively, the nodal point can be disposed at any other suitable vantage point within the spherical image 20 displayable by the device 14. In another alternative, the displayable scene can include a substantially planar and/or ribbon-like geometry from which the nodal point is distanced in a constant or variable fashion. Preferably, the display of the scene 18 can be performed within a 3D or 2D graphics platform such as OpenGL, WebGL, or Direct 3D. Alternatively, the display of the scene 18 can be performed within a browser environment using one or more of HTML5, CSS3, or any other suitable markup language. In another variation of the device 14 of the preferred embodiment, the geometry of the displayable scene can be altered and/or varied in response to an automated input and/or in response to a user input.

In another variation of the device 14 of the preferred embodiment, the real orientation portion of the orientation module 50 can be configured to create the projection matrix representing an orientation of the device 14 in a three-dimensional external frame of reference. As noted above, the projection matrix preferably includes a mathematical representation of an arbitrary orientation of a three-dimensional object such as the device 14 having three degrees of freedom relative to the external frame of reference. In one variation of the device 14 of the preferred embodiment, the external frame of reference can include a three-dimensional external frame of reference (i.e., real space) in which the gravitational force defines baseline directionality for the relevant coordinate system against which the absolute orientation of the device 14 can be measured. In one alternative noted above, the external frame of reference can include a fictitious external frame of reference, i.e., such as that encountered in a film or novel, whereby any suitable metrics and/or geometries can apply for navigating the device 14 through the pertinent orientations. One example of a fictitious external frame of reference noted above can include a fictitious space station frame of reference, wherein there is little to no gravitational force to provide the baseline directionality noted above. In such an example implementation, the external frame of reference can be fitted or configured consistently with the other features of the VAR scene.

In another variation of the device 14 of the preferred embodiment, the processor 70 can be further configured to adapt the scene displayable on the device 14 to the user 12 in response to a change in one of the real orientation or the user orientation. The processor 70 preferably functions to alter, change, reconfigure, recompute, regenerate, and/or adapt the displayable scene in response to a change in the real orientation or the user orientation in order to create a uniform and immersive user experience by adapting the displayable scene consistent with movement of the device 14 relative to the projection matrix and/or relative to the nodal point. Preferably, adapting the displayable scene can include at least one of the processor 70 adjusting a virtual zoom of the scene, the processor 70 adjusting a virtual parallax of the scene, the processor 70 adjusting a virtual perspective of the scene, and/or the processor 70 adjusting a virtual origin of the scene. Alternatively, adapting the displayable scene can include any suitable combination of the foregoing, performed by the processor 70 of the preferred embodiment substantially serially or substantially simultaneously, in response to a timing of any determined changes in one or both of the real orientation or the user orientation.

As shown in FIGS. 6A, 6B, 6C, and 6D, in one variation of the device 14 of the preferred embodiment, the processor is further configured to adjust a virtual zoom of the scene 18 in response to a change in a linear distance 16 between the device 14 and the nodal point 12. As shown in the FIGURES, the processor 70 of the preferred embodiment can be configured to alter a size of an aspect 22 of the scene 18 in response to an increase/decease in the linear distance 16 between the device 14 and the nodal point 12, i.e., the user's head. In another variation of the device 14 of the preferred embodiment, the device 14 can be configured to measure a distance 16 between the device 14 and the nodal point 12, which can include for example using a front facing camera 90 to measure the relative size of the nodal point 12 in order to calculate the distance 16. Alternatively, the adjustment of the virtual zoom can be proportional to a real zoom (i.e., a real relative sizing) of the nodal point 12 as captured by the device camera 90. As noted above, preferably as the distance decreases/increases, the size of the user's head will appear to increase/decrease, and the adjustment in the zoom can be linearly and/or non-linearly proportional to the resultant increase/decrease imaged by the camera 90. Alternatively, the distance 16 between the nodal point 12 and the device 14 can be measured and/or inferred from any other suitable sensor and/or metric, including at least those usable by the device 14 in determining the projection matrix as described above, including for example one or more cameras 90 (front/rear), an accelerometer, a gyroscope, a MEMS gyroscope, a magnetometer, a pedometer, a proximity sensor, an infrared sensor, an ultrasound sensor, and/or any module, portion, or component of the orientation module 50.

Figure 7A:
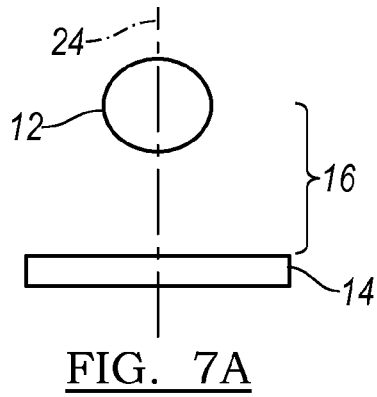
FIGS. 7A, 7B, 7C, and 7D are schematic representations of one or more additional aspects of the apparatus of the preferred embodiment of the present invention.
Figure 7B:
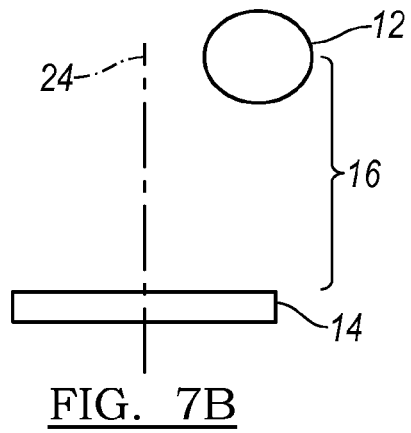
Figure 7C:
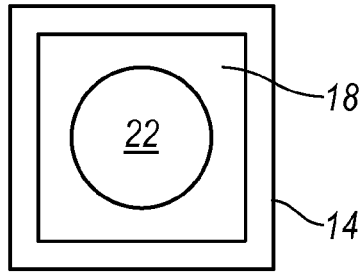
Figure 7D:
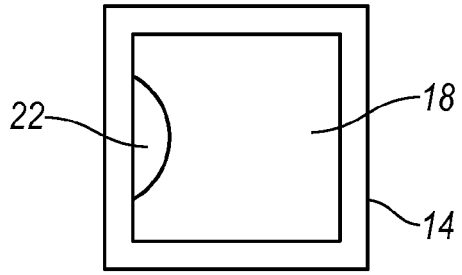
Figure 9A:
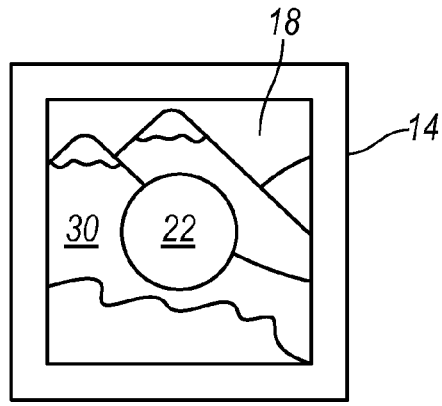
FIGS. 9A and 9B are schematic representations of one or more additional aspects of the apparatus of the preferred embodiment of the present invention.
Figure 9B:
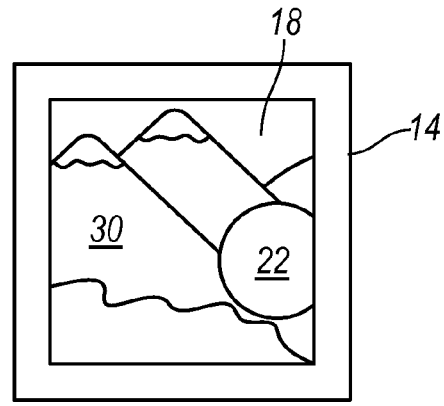

As shown in FIGS. 7A, 7B, 7C, and 7D, the processor 70 of the device of the preferred embodiment can be further configured to adjust a virtual parallax of the scene 18 in response to a change in a translational distance between the device 14 and the nodal point 12. As shown in FIG. 7B, movement of the device 14 relative to the nodal point 12 in a direction substantially perpendicular to imaginary line 24 can be interpreted by the processor 70 of the preferred embodiment as a request and/or input to move one or more aspects 22 of the scene 18 in a corresponding fashion. As shown in FIGS. 9A and 9B, the scene can include a foreground aspect 22 that is movable by the processor 70 relative to a background aspect 30. In another variation of the device 14 of the preferred embodiment, the processor 70 can be configured to identify one or more foreground aspects 22 and/or background aspects 30 of the displayable scene 18.

In another variation of the device 14 of the preferred embodiment, the processor 70 can be configured to measure a translational distance between the device 14 and the nodal point 12, which can include for example using a front facing camera 12 to measure the relative size and/or location of the nodal point 12 (i.e., the user's head) in order to calculate the translational distance. Alternatively, the translational distance between the nodal point 12 and the device 14 can be measured and/or inferred from any other suitable sensor and/or metric, including at least those usable by the device 14 in determining the projection matrix as described below, including for example one or more cameras 90 (front/rear), an accelerometer, a gyroscope, a MEMS gyroscope, a magnetometer, a pedometer, a proximity sensor, an infrared sensor, an ultrasound sensor, and/or any module, portion, or component of the orientation module 50.

Preferably, the translational distance is computed by the processor 70 as a function of both the size of the nodal point 12 (from the front facing camera 90) and a detection of a planar translation of the device 14 in a direction substantially orthogonal to the direction of the camera 90, thus indicating a translational movement without any corrective rotation. For example, one or more of the aforementioned sensors can determine that the device 14 is moved in a direction substantially orthogonal to the camera direction 90 (along imaginary line 24 in FIGS. 7A and 7B), while also determining that there is no rotation of the device 14 about an axis (i.e., axis 28 shown in FIG. 8B) that would direct the camera 90 radially inwards towards the nodal point 12. Preferably, the processor 70 of the device 14 of the preferred embodiment can process the combination of signals indicative of such a movement as a translational shift of the device 14 relative to the nodal point 12 and adapt a virtual parallax of the viewable scene accordingly.

Figure 8A:
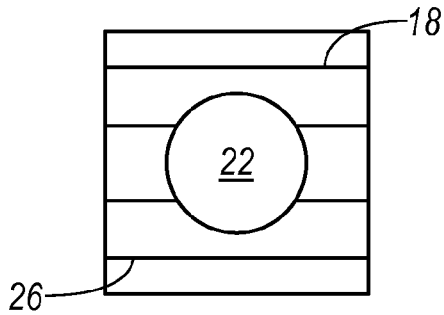
FIGS. 8A, 8B, and 8C are schematic representations of one or more additional aspects of the apparatus of the preferred embodiment of the present invention.
Figure 8B:
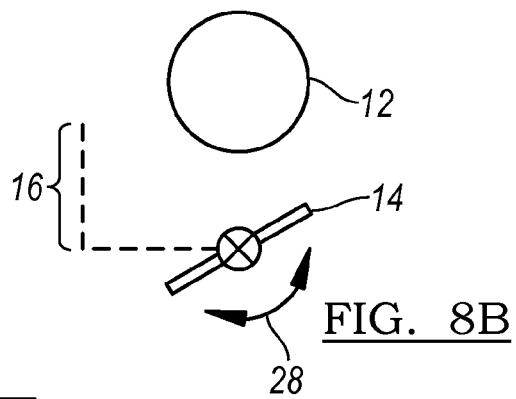
Figure 8C:
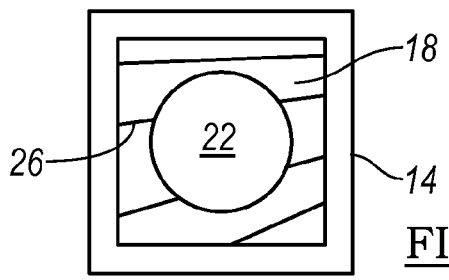

As shown in FIGS. 8A, 8B, and 8C, the processor 70 of the device 14 of the preferred embodiment can be further configured to adjust a virtual perspective of the scene 18 in response to a change in a rotational orientation of the device 14 and the nodal point 12. The processor 70 can preferably function to reorient, reshape, resize, and/or skew one or more aspects 22, 26 of the displayable scene 18 to convey a sense of perspective and/or a non-plan viewing angle of the scene 18 in response to a rotational movement of the device 14 relative to the nodal point 12. As noted above, adjustment of the virtual perspective of the scene is related in part to a distance between one end of the device and the nodal point and a distance between the other end of the device and the nodal point 12. As shown in FIG. 8B, rotation of the device 14 about axis 28 brings one side of the device 14 closer to the nodal point 12 than the other side, while leaving the top and bottom of the device 14 relatively equidistant from the nodal point 12.

As shown in FIG. 8C, preferred adjustment of aspects 22, 26 of the scene to create the virtual perspective will apply both to foreground aspects 22 and background aspects 26. The processor 70 of the preferred embodiment can adjust the virtual perspective of each aspect 22, 26 of the scene 18 in response to at least its position in the scene 18, the degree of rotation of the device 14 relative to the nodal point 12, the relative depth (foreground/background) of the aspect 22, 26, and/or any other suitable metric or visual cue. As noted above and as shown, lines that are parallel in the scene 18 when the device 14 is directed at the nodal point 12 shown in FIG. 8A will converge in some other direction in the display as shown in FIG. 8C as the device 14 is rotated as shown in FIG. 8B.

In another variation of the device 14 of the preferred embodiment, the processor 70 can be configured to reorient, reshape, resize, and/or translate one or more aspects of the displayable scene 18 in response to the detection of actual movement of the nodal point 12. As noted above, the nodal point can include an arbitrary point in real or fictitious space relative to which the scenes 18 described herein are displayable. Accordingly, any movement of the real or fictitious nodal point 12 preferably results in a corresponding adjustment of the displayable scene 18 by the processor 70. In another variation of the device 14 of the preferred embodiment noted above, the nodal point 12 can include a user's head or any suitable portion thereof.

Preferably, one of more portions or modules of the orientation module 50 can detect movement of the nodal point 12 in real space, which movements can be used by the processor 70 creating the corresponding adjustments in the displayable scene 18. The real position of the nodal point 12 can preferably be determined using any suitable combination of devices, including for example one or more cameras (front/rear), an accelerometer, a gyroscope, a MEMS gyroscope, a magnetometer, a pedometer, a proximity sensor, an infrared sensor, an ultrasound sensor and/or any module, portion, or component of the orientation module 50. As an example, a user 12 can wear a pedometer in communication with the device such that when the user walks through real space, such movement of the user/nodal point 12 is translated into movement in the VAR space, resulting in a corresponding adjustment to the displayable scene 18. Alternatively, the location module 60 of the device 14 of the preferred embodiment can determine a position and/or motion of the device 14 in response to a global positioning signal associated with the device 14. Preferably, real and/or or simulated movement of the user/nodal point 12 in space can result in the adjustment of the location of the origin/center/viewing point of the displayable scene 18.

In another variation of the device 14 of the preferred embodiment, the processor 70 can be further configured to display a floating-point exposure of the displayable scene in order to minimize lighting irregularities. As noted above, the displayable scene 18 can be any suitable geometry, including for example a spherical image 20 disposed substantially symmetrically about a nodal point 12 as shown in FIG. 5. Displaying a floating-point exposure preferably functions to allow the user to view/experience the full dynamic range of the image without having to artificially adjust the dynamic range of the image. Preferably, the processor 70 of the preferred embodiment is configured to globally adjust the dynamic range of the image such that a portion of the image in the center of the display is within the dynamic range of the device. As noted above, comparable high dynamic range (HDR) images appear unnatural because they attempt to confine a large image range into a smaller display range through tone mapping, which is not how the image is naturally captured by a digital camera.

As shown in FIG. 5, preferably the processor 70 preserves the natural range of the image 20 by adjusting the range of the image 20 to always fit around (either symmetrically or asymmetrically) the portion of the image 18 viewable in the approximate center of the device's display 40. As noted above, the device 14 of the preferred embodiment can readily adjust one or more aspects of the displayable scene 18 in response to any number of potential inputs relating to the orientation of the device 14 and/or the nodal point 12. Accordingly, the device 14 of the preferred embodiment can further be configured to adjust a floating point exposure of the displayable scene 18 in response to any changes in the displayable scene 18, such as for example adjustments in the virtual zoom, virtual parallax, virtual perspective, and/or virtual origin described in detail above.

The device 14 and methods of the preferred embodiment can be embodied and/or implemented at least in part as a machine configured to receive a computer-readable medium storing computer-readable instructions. The instructions are preferably executed by computer-executable components preferably integrated with the user device 14 and one or more portions of the processor 70, orientation module 50 and/or location module 60. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    determining a first orientation of a device relative to a three-dimensional frame of reference;
    determining a second orientation of the device relative to a nodal point, wherein the nodal point corresponds to a user using the device, and wherein the nodal point is at a first position relative to the three-dimensional frame of reference separate from the device;
    displaying a scene including a plurality of displayable aspects on the device based on the first orientation and the second orientation;
    responsive to a movement of the nodal point relative to the device, detecting a change in the second orientation of the device based on the movement of the nodal point from the first position to a second position relative to the three-dimensional frame of reference, wherein the movement of the nodal point relative to the device includes a change in linear distance between the nodal point and the device; and
    adapting the scene displayed on the device based on the detected change in the position of the nodal point, including increasing a size of a displayable aspect of the plurality of displayable aspects of the scene in response to a reduction in the linear distance between the nodal point and the device and decreasing the size of the displayable aspect of the plurality of displayable aspects of the scene in response to an increase in the linear distance between the nodal point and the device.

2. The method of claim 1 wherein adapting the scene displayed on the device based on the detected change in position of the nodal point further comprises:
    adjusting a virtual parallax of the scene in real-time in response to the detected change in position of the nodal point, wherein the detected change corresponds to a change in a translational distance between the device and the nodal point.

3. The method of claim 2, further comprising adjusting a virtual perspective of the scene in response to a change in a rotational orientation of the device and the nodal point.

4. The method of claim 3, wherein the change in the rotational orientation comprises a change in rotational orientation relative to both of two orthogonal axes of rotation.

5. The method of claim 3, wherein the change in the rotational orientation causes a first edge of the device to move closer to the nodal point and also causes a second edge to move farther from the nodal point; wherein the second edge is opposite the first edge.

6. The method of claim 5, wherein the change in rotational orientation is around a rotational axis; further comprising increasing a first size of a first virtual object displayed on a first section of the device and decreasing a second size of a second virtual object displayed on a second section of the device; wherein the first section of the device is between the first edge and the rotational axis; wherein the second section of the device is between the second edge and the rotational axis.

7. The method of claim 2, further comprising identifying a foreground aspect and a background aspect of the scene; wherein adjusting the virtual parallax comprises moving the foreground aspect relative to the background aspect.

8. The method of claim 7, wherein the foreground aspect and background aspect are identified from two-dimensional image data.

9. The method of claim 7, wherein identifying the foreground aspect and the background aspect of the scene further comprises identifying the foreground aspect and the background aspect in real-time.

10. The method of claim 1, wherein the scene is a live augmented reality scene.

11. The method of claim 1, wherein the scene comprises a virtual object having a shape positioned in a three-dimensional space and the shape is defined for all points in the three-dimensional space.

12. The method of claim 11, further comprising determining a virtual distance in the three-dimensional space between the virtual object and the first orientation of the device relative to the three-dimensional frame of reference.

13. The method of claim 1 wherein adapting the scene displayed on the device based on the detected change in position of the nodal point further comprises:
    translating the change in position of the nodal point relative to the three-dimensional frame of reference into a movement in a virtual space shown in the scene displayed on the device; and
    displaying a second scene on the device corresponding to the movement in the virtual space.

14. An apparatus comprising:
    a user interface comprising a display and a camera, the display and the camera substantially oriented in a first direction;
    a first orientation sensor configured to determine a three-dimensional spatial orientation of the user interface relative to a three-dimensional frame of reference;
    a second orientation sensor configured to determine a second orientation of the user interface relative to a nodal point, wherein the nodal point corresponds to a user using the device, and wherein the nodal point is at a first position relative to the three-dimensional frame of reference separate from the device; and
    a processor connected to the user interface, the first orientation sensor, and the second orientation sensor, the processor configured to:
        display a scene including a plurality of displayable aspects to the user on the display based on the first orientation and the second orientation;
        responsive to a movement of the nodal point relative to the device, detect a change in the second orientation of the device based on the movement of the nodal point from the first position to a second position relative to the three-dimensional frame of reference, wherein the movement of the nodal point relative to the device includes a change in linear distance between the nodal point and the device; and adapting the scene displayed on the device based on the detected change in the position of the nodal point including increasing a size of a displayable aspect of the plurality of displayable aspects of the scene in response to a reduction in the linear distance between the nodal point and the device and decreasing the size of the displayable aspect of the plurality of displayable aspects of the scene in response to an increase in the linear distance between the nodal point and the device.

15. The apparatus of claim 14, wherein the processor is further configured to adjust a virtual perspective of the scene in response to a change in a rotational orientation of the device and the nodal point.

16. The apparatus of claim 15, wherein the change in the rotational orientation comprises a change in rotational orientation relative to both of two orthogonal axes of rotation.

17. The apparatus of claim 15, wherein the change in the rotational orientation causes a first edge of the device to move closer to the nodal point and also causes a second edge to move farther from the nodal point; wherein the second edge is opposite the first edge.

18. The apparatus of claim 14, wherein the processor is further configured to identify a foreground aspect and a background aspect of the scene; wherein the processor is further configured to adjust the virtual parallax by performing actions comprising moving the foreground aspect relative to the background aspect.

19. The apparatus of claim 18, wherein the processor is further configured to identify the foreground aspect and background aspect from two-dimensional image data.

20. The apparatus of claim 18, wherein the processor is further configured to identify the foreground aspect and background aspect in real-time.

* * * * *